(12) United States Patent
Kropp

(10) Patent No.: US 6,370,181 B1
(45) Date of Patent: Apr. 9, 2002

(54) OPTICAL TRANSMISSION DEVICE

(75) Inventor: Jörg-Reinhardt Kropp, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/375,066

(22) Filed: Aug. 16, 1999

(30) Foreign Application Priority Data

Aug. 14, 1998 (DE) ......................... 198 38 330

(51) Int. Cl.[7] ................................. H01S 3/08
(52) U.S. Cl. ..................... 372/107; 372/98; 372/108; 372/70; 372/9
(58) Field of Search ................. 372/9, 107, 69, 372/98, 108, 70

(56) References Cited

U.S. PATENT DOCUMENTS 6,049,558 A * 4/2000 Harada et al. ............ 378/107

FOREIGN PATENT DOCUMENTS

EP 0786838 A2 7/1997
WO WO92/20171 11/1992

OTHER PUBLICATIONS

Published International Application No. 99/08348 (Stange), dated Feb. 18, 1999.
Published International Application No. 95/18479 (Hibbs-Brenner), dated Jul. 6, 1995.

* cited by examiner

Primary Examiner—Leon Scott, Jr.
(74) Attorney, Agent, or Firm—Herbert L. Lerner; Laurence A. Greenberg; Werner H. Stemer

(57) ABSTRACT

The optical transmission device comprises a transmitter which emits radiation vertically with respect to a covering surface. A reflection surface reflects a portion of the emitted radiation back onto an optically sensitive reception zone of a monitor receiver which is disposed on the same side as the transmitter. An intermediate body with a reflecting circumferential surface is disposed between the reflection surface and the reception zone. At least a portion of the reflected radiation passes from the circumferential surface to the reception zone, which significantly increases the yield of the reflected portion used for monitoring purposes.

8 Claims, 1 Drawing Sheet

OPTICAL TRANSMISSION DEVICE

BACKGROUND OF THE INVENTION

Field of the Invention

The invention lies in the field of light-emitting transmission devices, particularly for optical data transmission purposes, which are equipped with a so-called monitoring unit for power control. Specifically, for many applications, it is desirable or essential, for example for safety reasons, to stabilize the output power of a transmitter, which is usually a laser, irrespective of temperature fluctuations and aging effects, for example. In the case of edge or side-radiating lasers, a power monitor can be arranged on that laser side or laser edge which is not intended for useful power output. The radiation (loss) emanating at that side can thus be used for control purposes.

Relatively recent developments and progress in production processes increasingly also allow economic production of so-called vertically emitting laser transmitters (VCSEL= Vertical Cavity Surface Emitting Laser). For the purpose of satisfying high quality demands towards a constant output power, however, the VCSEL transmitters require a control unit with a monitoring device.

In that regard, the invention relates to an optical transmission device having an optical transmitter with an emission zone. Upon activation, the transmitter emits radiation vertically with respect to a covering surface of the transmitter. The device further has a reflection surface which reflects a portion of the emitted radiation toward the transmitter side, and a monitor receiver is arranged on the transmitter side with an optically sensitive reception zone on which at least a portion of the reflected radiation impinges.

Published international application WO 95/18479 (see introduction) describes a basic design in which a fraction of the radiation emitted from a vertically radiating transmitter reaches a monitor unit (photodiode) via a beam splitter. The output signal from the monitor unit is input into a control circuit which controls the drive current of the laser (operating point) such that a desired transmission output power is achieved. On that basis, WO 95/18479 describes an optical transmission device in which a vertically emitting laser (VCSEL) has an integrated photodetector which evaluates radiation emanating on the underside of the laser. That prior art design is comparatively complex and presupposes that the laser transmitter and monitor unit are integrally formed. It is thereby not possible to fit the transmitter with a monitoring unit at a later time or as an option.

A transmission device of the type mentioned above is disclosed in published European application EP 0 786 838 A2 (FIG. 4E). To produce an integrated controlled laser light source, that transmission device is provided with a vertically radiating laser as transmitter, which has an emission zone radiating perpendicularly to a covering surface. A monitor unit having an optically sensitive reception zone is provided for power control. The emitted radiation arrives at a spherical lens whose surface on the transmitter side acts as a reflection surface. The reflection surface reflects a portion of the emitted radiation back onto the reception zone, which can be arranged around or next to the emission zone. The predominant portion of the emitted radiation passes through the spherical lens to a coupling zone. The coupling zone may be formed, for example, as an optical conductor connector receptacle.

The generally slightly divergent course of the emitted radiation means that it broadens out, so that, with regard to the resultant reduced intensity, either a reception zone with a comparatively large area must be provided or else a lower yield must be accepted.

SUMMARY OF THE INVENTION

It is accordingly an object of the invention to provide a transmission device, which overcomes the above-mentioned disadvantages of the heretofore-known devices and methods of this general type and which renders it possible that as large a proportion of the reflected radiation as possible is able to impinge on as small a reception zone as possible.

With the foregoing and other objects in view there is provided, in accordance with the invention, an optical transmission device, comprising:

an optical transmitter disposed at a transmitter side, the transmitter having a covering surface and an emission zone for emitting radiation vertically with respect to the covering surface;

a reflection surface spaced apart from the covering surface for reflecting a portion of the radiation back toward the transmitter side;

a monitor receiver disposed at the transmitter side, the receiver being formed with an optically sensitive reception zone; and an intermediate body disposed between the reflection surface and the reception zone, the intermediate body being formed with a reflecting circumferential surface;

wherein the reception zone of the receiver receives radiation reflected from the reflection surface, and whereby at least a part of the portion of the radiation reflected from the reflection surface passes from the circumferential surface to the reception zone.

In other words, the objects are satisfied with the intermediate body that is formed with a reflecting circumferential surface and is arranged between the reflection surface and the reception zone. At least some of the reflected radiation is thereby forwarded to the reception zone via the circumferential surface.

A significant advantage of the invention is that a considerable increase in the radiation yield which can be used for control purposes is made possible with just a single, simple and inexpensive additional part. This means that, in comparison with conventional arrangements, a relatively small and thus inexpensive reception zone can be provided, so that, overall, the production costs for the transmission device according to the invention can be significantly reduced. A further advantage is that light travelling from the reflecting circumferential surface to the reception zone does not stray and hence crosstalk effects can be effectively avoided, particularly in the case of multichannel transmission devices.

In accordance with an added feature of the invention, the intermediate body is a solid body and the reflecting circumferential surface is formed by a curved surface of the solid body. This refinement of the invention is particularly preferred in terms of production technology. The light reflected back from the reflection surface and input into the intermediate body passes through the intermediate body and, if appropriate, is reflected by the outer curved surface of the intermediate body. The curved surface, of course, is made reflective for this purpose.

In accordance with an additional feature of the invention, the intermediate body is formed with an aperture having an inner wall surface, and the reflecting circumferential surface is formed by the inner wall surface of the aperture. This embodiment of the invention is preferred in terms of material requirement and weight of the intermediate body. The reflecting circumferential surface is formed by the inner wall (inner curved surface) of the aperture. As a preference in terms of production technology, and in accordance with another feature of the invention, the intermediate body is a hollow cylinder.

In accordance with a further feature of the invention, the circumferential surface is shaped as a barrel or a drum. The term "circumferential surface" herein means the inner wall of the aperture or the outer curved surface of the solid intermediate body. The barrel or drum design enables a particularly high proportion of the reflected radiation portion to be directed onto the reception zone.

In accordance with again an added feature of the invention, the intermediate body is a molded plastic body. Production costs are very low in plastics processing and production technology in plastic molding technology allows very accurate yet inexpensive devices.

In accordance with again a further feature of the invention, the intermediate body is a solid, molded plastic body and the reflecting circumferential surface is formed by a curved surface of the plastic body.

In accordance with a concomitant feature of the invention, a lens is integrally formed on the intermediate body, and the lens forms the reflection surface. This embodiment further simplifies the design and reduces the number of individual parts to be handled and positioned during assembly.

Other features which are considered as characteristic for the invention are set forth in the appended claims.

Although the invention is illustrated and described herein as embodied in an optical transmission device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figures 1, 2:
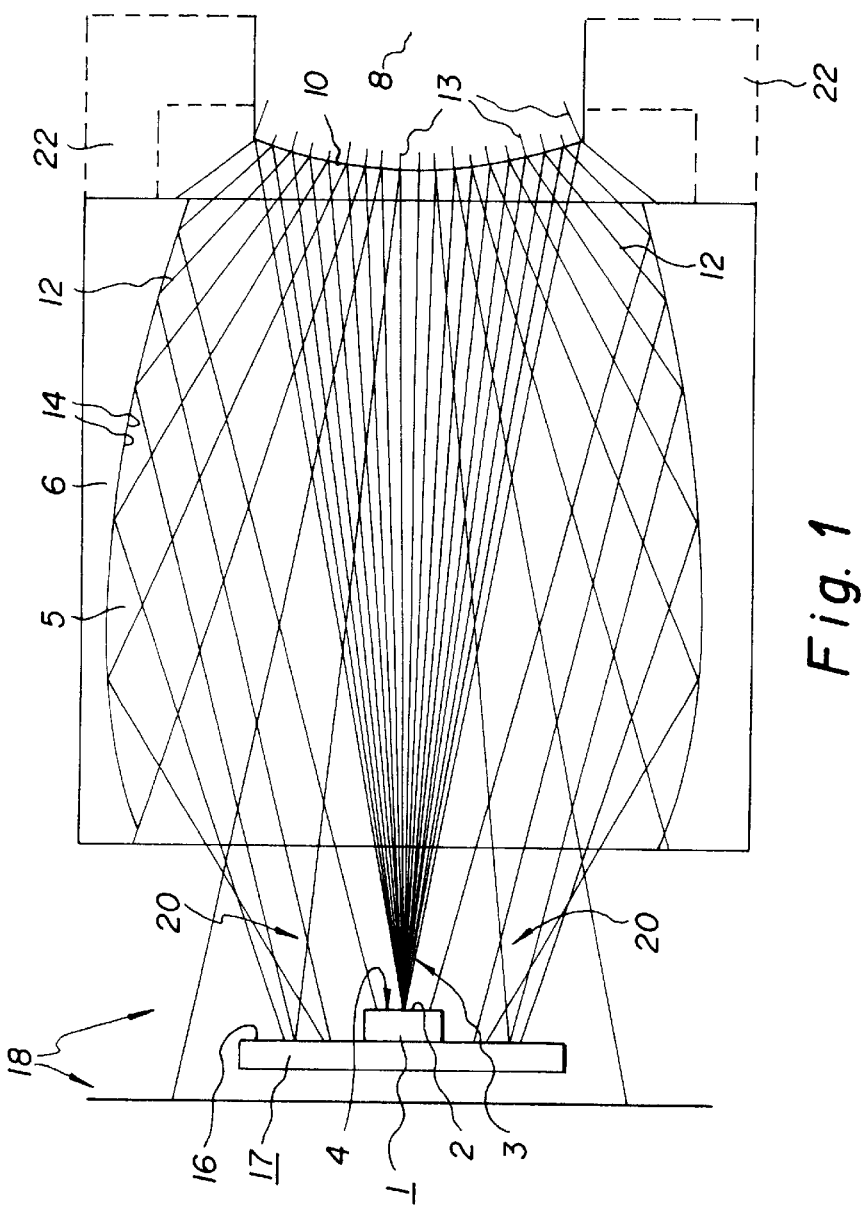
FIG. 1 is a diagrammatic view of a transmission device according to the invention.
FIG. 2 is a perspective view of an exemplary embodiment of a reflecting circumferential surface of an intermediate body.

Referring now to the figures of the drawing in detail and first, particularly, to FIG. 1 thereof, there is seen a transmission device which comprises an optical transmitter 1 with an emission zone 2. The transmitter 1 is conventionally contacted and it is electrically driven in a manner which is well known to those of skill in the art. The transmitter 1 outputs optical radiation (light) 3 on the basis of the drive. In this context, the radiation 3 is emitted vertically with respect to a covering surface 4 of the transmitter 1. The emitted radiation 3 passes through an aperture 5 (described in more detail below) in an intermediate body 6 to an input lens 8. The input lens 8 is formed with a boundary surface 10 facing the transmitter 1. The boundary surface reflects a portion 12 of the emitted radiation 3 back toward the transmitter 1. Individual beams 12 are illustrated for this in FIG. 1 merely by way of example. The majority 13 of the emitted radiation 3 passes through the lens 8 to a coupling zone, which is not illustrated in any detail for the purpose of clarity, and which can be formed by an optical conductor connector receptacle, for example. Here, this portion of the radiation (useful radiation) is input into an optical conductor.

Instead of the lens 8, it is in principle also possible for a coupling zone which holds an optical conductor connector, for example, to be provided directly. In that case, the reflection surface 10 is formed by the end face of the optical conductor connector. It is also conceivable for the reflection surface to be formed by a planar reflection plate which is located in the beam path and has a partially permeable layer.

The reflected portion of the radiation 12 predominantly hits a reflecting inner surface 14 of the intermediate body 6. The inner surface 14 forms the inner wall surface of the aperture 5. At this point, the radiation portion 12 is reflected again. Specifically, the advantageous geometry of the inner surface 14 concentrates the radiation portion 12 in a controlled manner onto the reception zone 16 of a monitor receiver 17 provided on the same side 18 of the configuration as the transmitter 1. The reception zone 16 is designed as a light-sensitive surface and it is adapted to generate an electrical output signal corresponding to the radiation intensity of the light signal impinging on the reception zone. The output signal can be used for power control and to set the operating point of the optical transmitter 1. Hence, the monitor receiver 17 is used to produce a power control loop for the transmitter 1 and may be referred to as the power monitor.

As illustrated in FIG. 1, the reflection of the reflected radiation portion 12 at the inner surface 14 causes the reception zone to be illuminated with considerable intensity and thus results in an increased radiation yield 20 impinging on the reception zone 16. The intermediate body 6 can, in principle, be in the form of a hollow cylinder. Even an inner surface 14 of circular cylindrical shape would make a considerable increase in the radiation yield possible. However, the curved shape of the inner surface which can be seen in FIG. 1 is provided as a particular preference, and the curvature can advantageously comprise the outer surface of a drum body or of a barrel-shaped body.

Referring now to FIG. 2, there is shown a useful such geometrical shape, the jacket surface of which is formed by an arc B. The body is referred to as a barrel body and is described, for example, by Bronstein and Semendjajew in *Taschenbuch der Mathematik* [Mathematics Handbook], 6th ed., Verlag Harri Deutsch, Frankfurt, Germany, p.152, FIG. 133.

The intermediate body can, as an alternative to the hollow structure of FIG. 1, also be a solid body 30, as illustrated in FIG. 2. The barrel body of FIG. 2 would be made of a translucent or photoconductive material. In this case, the reflective outer curved surface 32 of the intermediate body 30 forms the circumferential surface via which the reflected radiation—in this variant, running inside the intermediate body material—reaches the reception zone. In this case too, it is advantageous if the intermediate body 30 itself and thus the (outer) circumferential surface 32 has the shape of a drum or barrel.

The intermediate body 6 is particularly preferably made of plastic using molding technology. The lens 8 can be mounted directly on the intermediate body by means of mounts 22, as shown in dashed lines in FIG. 1. As regards ease of handling and assembly, it is particularly advantageous if the lens 8 together with the mounts 22 are designed as an integral extension of the intermediate body 6. This component can advantageously be produced in a single plastic molding process.

I claim:

1. An optical transmission device, comprising:
   an optical transmitter disposed at a transmitter side, said transmitter having a covering surface and an emission zone for emitting radiation vertically with respect to said covering surface;
   a reflection surface spaced apart from said covering surface for reflecting a portion of the radiation back toward said transmitter side;
   a monitor receiver disposed at the transmitter side, said receiver being formed with an optically sensitive reception zone; and
   an intermediate body disposed between said reflection surface and said reception zone, said intermediate body being formed with a reflecting circumferential surface;
   wherein said reception zone of said receiver receives radiation reflected from said reflection surface, and whereby at least a part of the radiation reflected from said reflection surface travels to said reception zone via said circumferential surface.

2. The transmission device according to claim 1, wherein said intermediate body is a solid body and said reflecting circumferential surface is formed by a curved surface of said solid body.

3. The transmission device according to claim 1, wherein said intermediate body is formed with an aperture having an inner wall surface, and said reflecting circumferential surface is formed by said inner wall surface of said aperture.

4. The transmission device according to claim 3, wherein said intermediate body is a hollow cylinder.

5. The transmission device according to claim 1, wherein said circumferential surface has a shape of one of a barrel and a drum.

6. The transmission device according to claim 1, wherein said intermediate body is a molded plastic body.

7. The transmission device according to claim 1, wherein said intermediate body is a solid, molded plastic body and said reflecting circumferential surface is formed by a curved surface of said plastic body.

8. The transmission device according to claim 1, which further comprises a lens integrally formed on said intermediate body, said lens having said reflection surface.

* * * * *